(12) United States Patent
Kirshtein

(10) Patent No.: US 7,730,243 B2
(45) Date of Patent: Jun. 1, 2010

(54) KVM SWITCH SYSTEM WITH A SIMPLIFIED EXTERNAL CONTROLLER

(75) Inventor: Philip M. Kirshtein, New Market, AL (US)

(73) Assignee: Avocent Corporation, Huntsville, AL (US)

( * ) Notice: Subject to any disclaimer, the term of this patent is extended or adjusted under 35 U.S.C. 154(b) by 81 days.

(21) Appl. No.: 11/802,015

(22) Filed: May 18, 2007

(65) Prior Publication Data
US 2008/0288677 A1    Nov. 20, 2008

(51) Int. Cl.
G06F 13/12    (2006.01)
G06F 3/00    (2006.01)
(52) U.S. Cl. .................... 710/73; 710/5; 710/15
(58) Field of Classification Search .............. None
See application file for complete search history.

(56) References Cited

U.S. PATENT DOCUMENTS

| | | | |
|---|---|---|---|
| 5,499,377 A | 3/1996 | Lee | |
| 5,721,842 A | 2/1998 | Beasley et al. | |
| 5,884,096 A | 3/1999 | Beasley et al. | |
| 6,073,188 A | 6/2000 | Fleming | |
| 6,378,009 B1 | 4/2002 | Pinkston, II et al. | |
| 6,388,658 B1 | 5/2002 | Ahern et al. | |
| 6,671,756 B1 * | 12/2003 | Thomas et al. | 710/73 |
| 2004/0215617 A1 | 10/2004 | Ramsey et al. | |
| 2005/0216620 A1 | 9/2005 | Sandulescu et al. | |
| 2005/0289403 A1 | 12/2005 | Rothman et al. | |
| 2006/0253639 A1 | 11/2006 | Lee et al. | |
| 2007/0070042 A1 | 3/2007 | Lin et al. | |
| 2008/0005414 A1 * | 1/2008 | Liu et al. | 710/62 |
| 2008/0222326 A1 * | 9/2008 | Liu et al. | 710/62 |

OTHER PUBLICATIONS

"AMX Switch Series Installer/User Guide" published by Avocent Corporation in 2006, Document No. 590-222-501K.
"AutoView 2020/2030 Installer/User Guide" published by Avocent Corporation in 2005, Document No. 590-495-501A.
"DSR Switch Installer/User Guide" published by Avocent Corporation in 2005, Document No. 590-419-501B.
"Outlook User Guide" Fourth Edition, Aug. 1998.
"SwitchView Desktop KVM Switches," published by Avocent 2005, Document No. 1105-SV-BRO.
International Search Report and Written Opinion in PCT Application No. PCT/US2008/06377.
"One for All and all for one," PolyCon Data Systems GmbH.
Elsner Technologies Company MultYCon PolYCon Console Switching and Management System Ordering Catalog, Feb. 1996, 20 pages.
Elsner Technologies Company PolYCon Products Brochure, 29 pages.

(Continued)

*Primary Examiner*—Alan Chen
(74) *Attorney, Agent, or Firm*—Davidson Berquist Jackson & Gowdey LLP

(57) ABSTRACT

A KVM switch system with external control functionality is described. A KVM switch is able to be controlled from an external device. The external device can either include a single button dedicated to controlling the desktop KVM switch or indicate a state of the KVM switch. The external device can be connected to the desktop KVM switch through a plurality of communication media. The external device can be small in size and attached to an object on a user's desktop.

19 Claims, 21 Drawing Sheets

OTHER PUBLICATIONS

Intelligent Network Management System for 1,024 PCs, PolYCon Data Systems Press Release, 3 pages.

PolyCon Control Unit: A further step to perfect network management, PolyCon GmbH Data Systems.

PolYCon Data Systems PolYCon Management System, 4 pages.

Remote Control Panel (2004).

Remote Control Panel brochure, Rose Electronics (undated).

The PolyCon Management System Order Catalog, PolyCon GmbH Data Systems, c1994.

The PolyCon Management System Ordering Catalog, PolyCon GmbH Data Systems.

The PolyCon Management-System Products Pricelist, PolyCon GmbH Data Systems, Aug. 1, 1994, pp. 1-2.

* cited by examiner

KVM SWITCH SYSTEM WITH A SIMPLIFIED EXTERNAL CONTROLLER

FIELD OF DISCLOSURE

This disclosure relates to a simplified external controller for controlling a KVM (Keyboard, Video, Mouse) switch.

BRIEF DESCRIPTION OF THE DRAWINGS

The following description, given with respect to the attached drawings, may be better understood with reference to the non-limiting examples of the drawing, wherein the drawings show.

INTRODUCTION

Desktop KVM (Keyboard, Video, and Mouse) switches are designed to allow a single user control of multiple PCs (targets) using a single keyboard, monitor, and mouse. Desktop KVM switches can be designed to interface with either PS/2 or USB type control devices and can be designed to allow a user control of any number of targets through such connections. Desktop KVM switches control a target by simply providing a connection between the target's KVM ports and a user's respective keyboard, monitor, and mouse. Examples of such KVM switches are Avocent KVM switches sold under the trademark SWITCHVIEW. SwitchView KVM switches are described in submitted document entitled "SwitchView Desktop KVM Switches," published by Avocent 2005, Document No. 1105-SV-BRO, which is incorporated by reference in its entirety.

Figure 1:
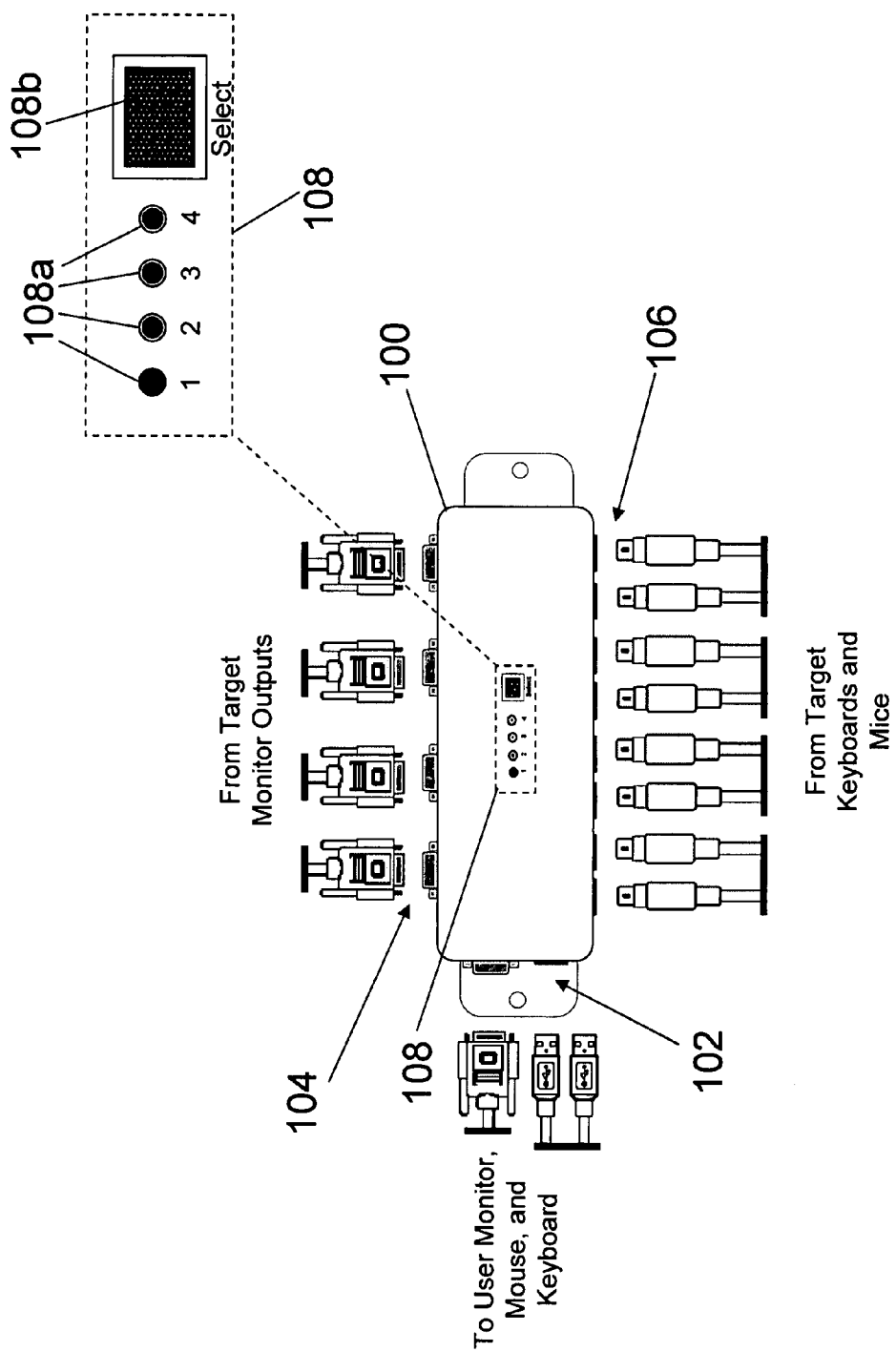
FIG. 1: a prior art single user desktop KVM switch with an onboard selection mechanism.

FIG. 1 shows a prior art 4-port desktop KVM switch 100 capable of controlling four targets. Switch 100 receives video signals from respective targets (not shown) at video ports 104 and accesses keyboard and mouse ports from respective targets at ports 106. Switch 100 allows a user to control a designated target by coupling the communication path from a selected target interfaced at 104 and 106 to user KVM port 102. KVM port 102 includes a video connection, a keyboard connection, and a mouse connection. Such switches include an onboard control interface 108 which typically includes a display 108a. Typically displays, as shown for display 108a, consist of an LED for each target device KVM port, where an illuminated LED indicates that the corresponding KVM port is being coupled to port 102 and as such a corresponding target is being controlled by the user.

Such switches are typically designed to be placed within reach of the user (e.g. on a desktop) so that a user can switch which target is being controlled using an onboard control mechanism 108b. Control mechanism 108b is typically a select button that when pressed cycles through KVM ports corresponding to the targets. U.S. Pat. No. 6,073,188 to Fleming, which is incorporated by reference in its entirety, discloses a KVM switch with an onboard control interface for controlling which target is coupled to the user and a display indicating which target device is coupled to the user. Other KVM switch boxes with on-board displays have also been manufactured and sold in prior art switches of Avocent Corporation of Huntsville, Ala. and its predecessors Apex Computer Products of Redmond, Wash. and Cybex Corporation products of Huntsville, Ala.

In addition to using the control mechanism 108b to switch between targets, some prior art desktop KVM switches enable the user to switch between targets at the user station with the user's keyboard by using hotkey commands. For example, a user may switch to a target by pressing the ScrLk Key twice and then pressing a number (1-4) corresponding to the set of KVM ports a target is connected to.

U.S. Pat. No. 5,721,842 to Beasley, which is commonly owned by the assignee of the present application, Avocent Corporation of Huntsville, Ala., and is incorporated by reference in its entirety, describes a KVM switch that can be controlled at a user station by using hotkey commands in combination with a graphical user interface that is displayed on the user's monitor. Beasley describes that the user can switch which target device is coupled to the user's KVM port by using a keystroke (Print Screen key) to activate an onscreen menu and selecting a command from the onscreen menu.

Hotkey commands have the drawback of requiring a user to memorize a sequence of keystrokes or have access to a reference which specifies which keystrokes correspond to which functions. Hotkeys also suffer from the drawback that the user may inadvertently activate a hotkey command through keystrokes that occur within the normal course of controlling a target. Further, when the switch 100 is not within the user's view, the user is unable to use the display 108a to confirm which target is coupled to the KVM port 102, which could cause a user to inadvertently control the wrong target.

Although hotkey commands incorporating a graphical user interface displayed on the user's monitor have been highly successful and commercially advantageous, especially in medium and large scale installations, when the graphical user interface is displayed it must be overlayed on the image being displayed on the user's monitor and as such might obscure important information. For small installations (such as 1×2 and 1×4), using a graphical user interface to switch which target is being controlled is not as simple as using an onboard control interface since a user must enter keystrokes and then select a target from a menu as opposed to just manipulating a physical access mechanism. Further, hotkey commands incorporating a graphical user interface require some type of video output generating circuit to create the graphical user interface which adds significant cost to the switch system, especially where USB peripheral devices are supported.

The following paragraphs and accompanying FIGS. 2-7 describe additional prior art KVM switch systems and the ways that such systems allow for a user to be connected to a target.

Figure 2:
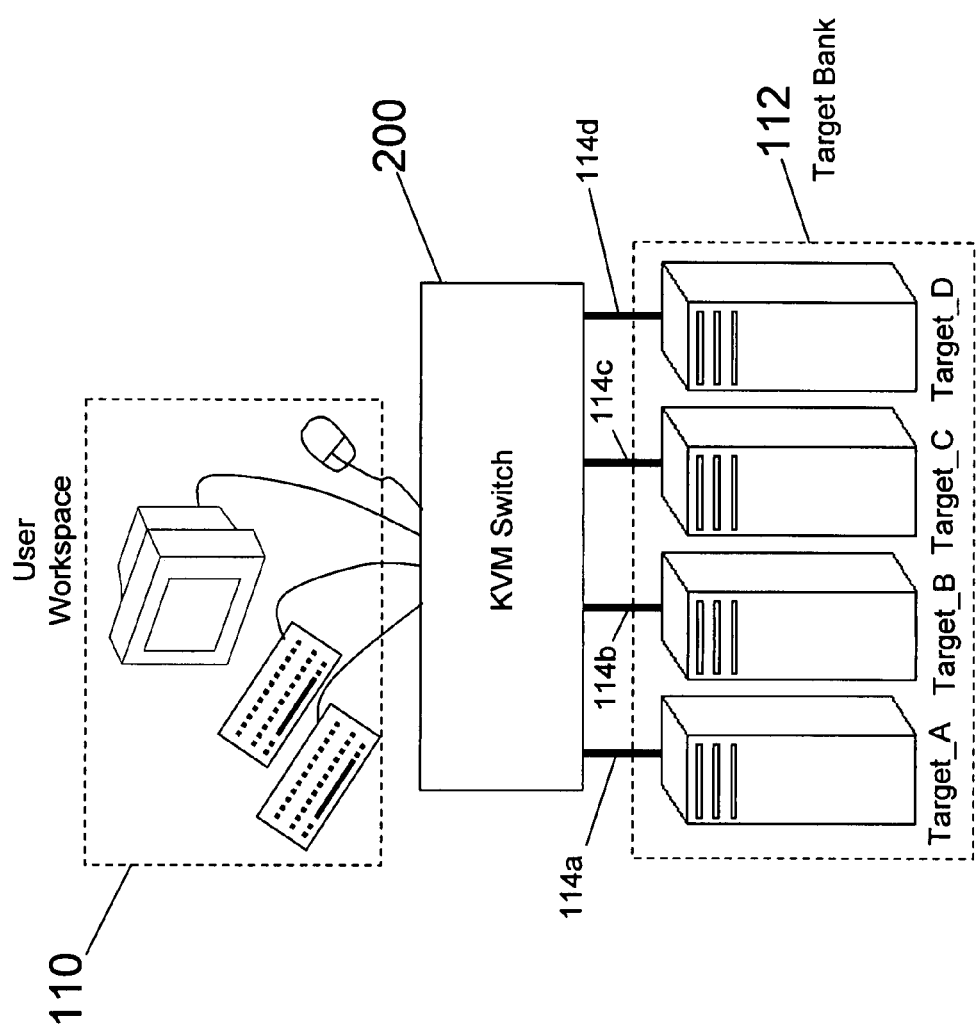
FIG. 2: a prior art single user desktop KVM switch system that supports multiple keyboards.

FIG. 2 shows a prior art single user KVM switch 200 with a plurality of keyboard and mouse connections where each of a plurality of targets 112 is connected to switch 200 via respective KVM connections 114a, 114b, 114c, and 114d. KVM switch 200 is similar to KVM switch 100 described in accordance with FIG. 1 and is designed for a single user. Switch 200 does not provide multiple monitor connections, but provides multiple sets of keyboard and mouse connections—typically a set of PS/2 ports and a USB port to allow a user to connect either type of keyboard/mouse devices. Since switch 200 has two sets of ports, a user can connect multiple keyboards to switch 200 simultaneously. Although KVM switch 200 allows a user to have multiple keyboards connected to KVM switch 200 simultaneously (with one keyboard controlling a target and the other switching which target is being controlled), KVM switch 200 does not solve the drawbacks of hotkey commands and has the additional drawback that two keyboards may clutter the user's workspace 110. Further, standard keyboards will not provide the user with an indication as to which target is being controlled. An example of such a switch is the Avocent SWITCHVIEW MM1/MM2 switches which are described in submitted document entitled "SwitchView Desktop KVM Switches" published by Avocent Corporation in 2005, Document No. 1105-SV-BRO, which is incorporated by reference in its entirety.

Figure 3:
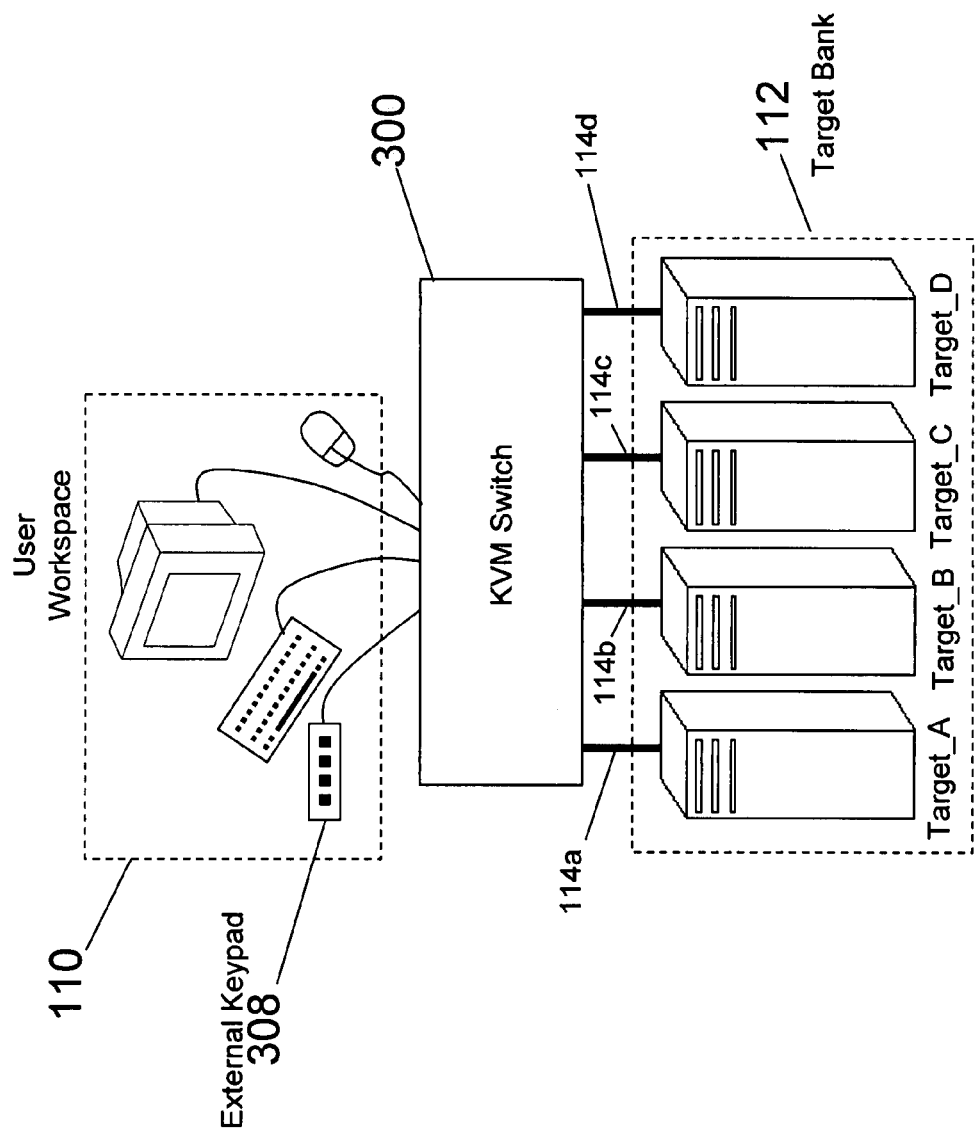
FIG. 3: a prior art single user desktop KVM switch system that supports an external keypad.

FIG. 3 shows a prior art single user KVM switch 300 with a plurality of keyboard and mouse connections where each of a plurality of targets 112 is connected to switch 300 via respective KVM connections 114a, 114b, 114c, and 114d. KVM switch 300 includes an auxiliary port (not shown) for connecting external keypad 308. Auxiliary port of KVM switch 300 is an RJ-45 port. External keypad 308 allows the user to switch which target device is being controlled without using the keyboard. Keypad 308 does not include a display indicating which of the targets 112 the user is controlling. Examples of such KVM switches are KVM switches that were sold under the under the name Apex Outlook. Apex Outlook KVM switches are described in submitted document entitled "Outlook User Guide" Fourth Edition, August 1998, which is incorporated by reference in its entirety.

Figure 4:
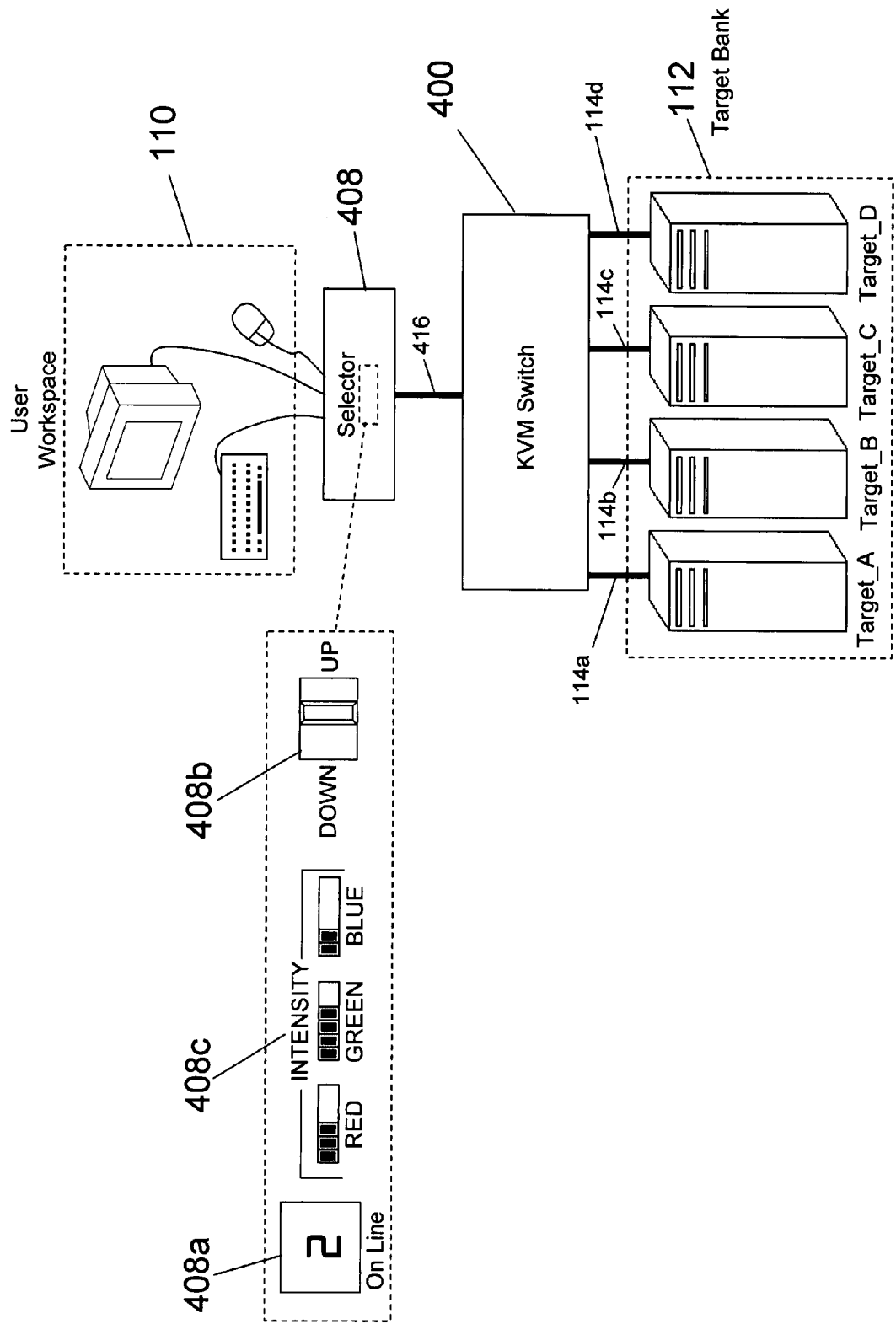
FIG. 4: a prior art desktop KVM switch system with an external selection mechanism where the external selection mechanism interfaces all of the user's KVM devices.

U.S. Pat. No. 5,499,377 to Lee, which is incorporated by reference in its entirety, describes a desktop KVM switch where a user can switch which target is being controlled by using a control mechanism that is similar to the onboard control interface 108 described in accordance with FIG. 1. That control mechanism is on a selector device that is external to the KVM switch. The selector device described in Lee is located intermediate to the user and the KVM switch and interfaces all of the user's KVM devices and the switch. The selector device in Lee includes circuitry that allows a user to adjust the color intensity of the video signal. FIG. 4 shows an exemplary prior art switch where selector 408 comprises a rocker switch 408b that allows the user to control the switch 400 and a display 408a that displays which target is coupled to the user's workspace 110. Selector 408 is connected to switch 400 via cable 416 which comprises KVM cables and a data cable for control signals. Selector 408 is also connected directly to all of the user's KVM devices. Selector 408 includes circuitry for adjusting the intensity level of the received video signals. Intensity levels are adjusted with color dials 408c. Such a configuration is disadvantageous because it limits where selector 408 can be placed and requires selector 408 to have ports and circuitry for respective KVM cables which adds costs to the selector 408.

Figure 5:
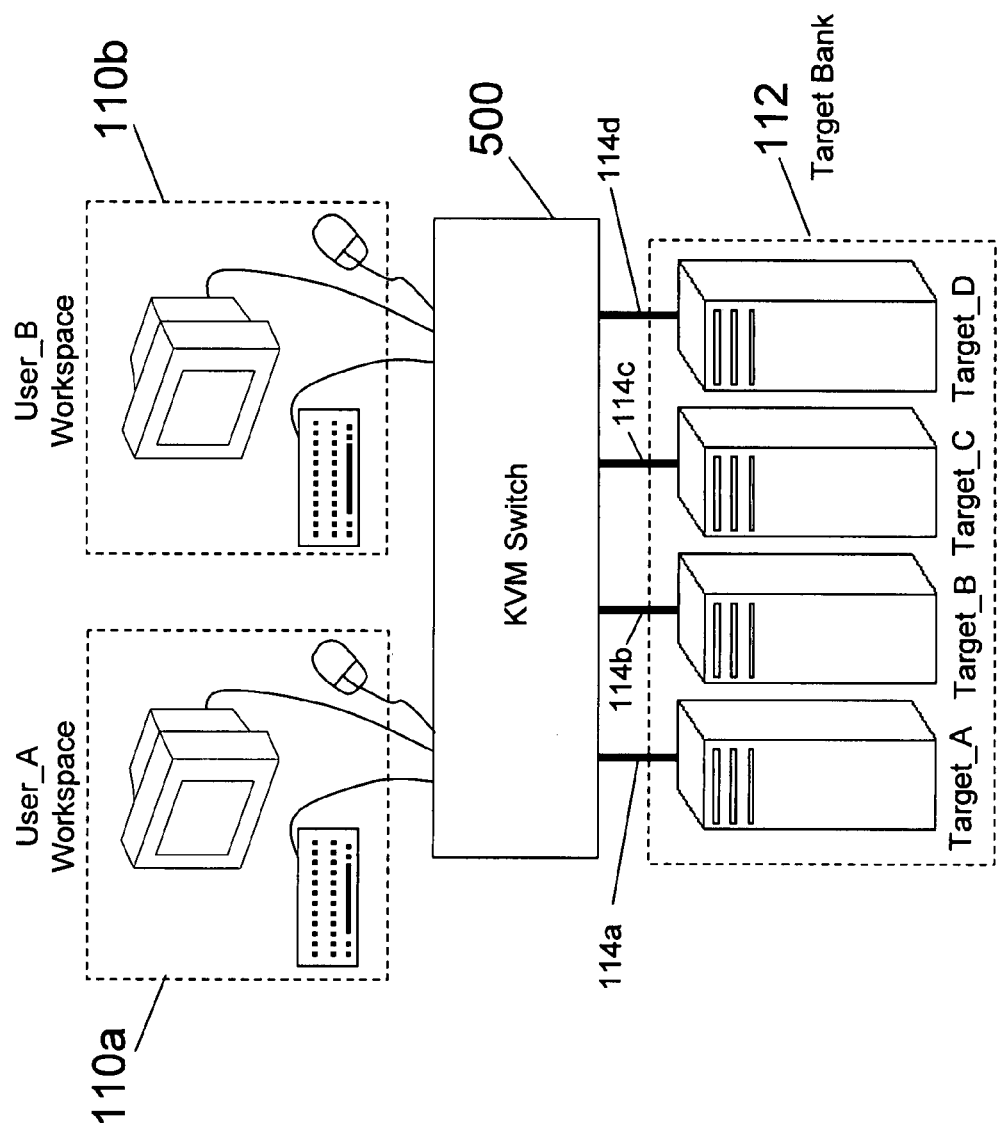
FIG. 5: a prior art KVM switch system where multiple users' KVM devices are connected directly to the KVM switch.

FIG. 5 shows a KVM switch 500 that supports two local users, with one user using workspace 110a and the other user using workspace 110b. Switch 500 allows each user to switch which target is being controlled by using hotkey commands and an accompanying graphical user interface as described in accordance with FIG. 1. In addition, switch 500 provides the additional functionality of allowing a user to view which target the other user is connected to and to disconnect the other user from the target using the graphical user interface. Examples of such KVM switches are Avocent KVM switches sold under the trademark AUTOVIEW. AutoView KVM switches are described in submitted document entitled "AutoView 2020/2030 Installer/User Guide" published by Avocent Corporation in 2005, Document No. 590-495-501A, which is incorporated by reference in its entirety.

Figure 6:
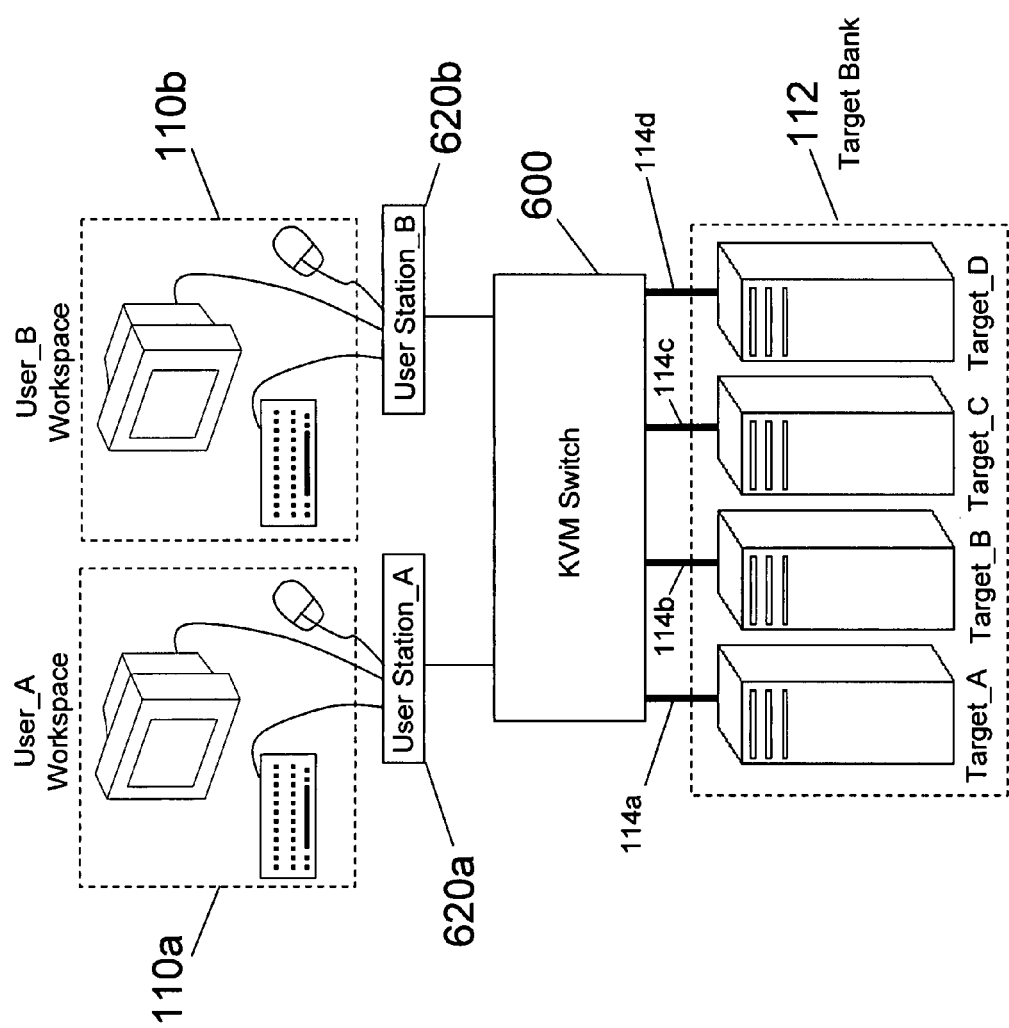
FIG. 6: a prior art KVM switch system where multiple users are connected to the KVM switch through user stations.

FIG. 6 shows a KVM switch 600 that is similar to KVM switch 500 in that switch 600 supports multiple users. KVM switch 600 differs from switch 500 in that users are connected to switch 600 through user stations 620a and 620b. Through the user stations a user can either connect or disconnect another user from a target by entering a command specifying the user and the target. An example of such KVM switches are Avocent KVM switches sold under the AMX trademark. AMX KVM switches are described in submitted document entitled "AMX Switch Series Installer/User Guide" published by Avocent Corporation in 2006, Document No. 590-222-501K, which is incorporated by reference in its entirety.

Figure 7:
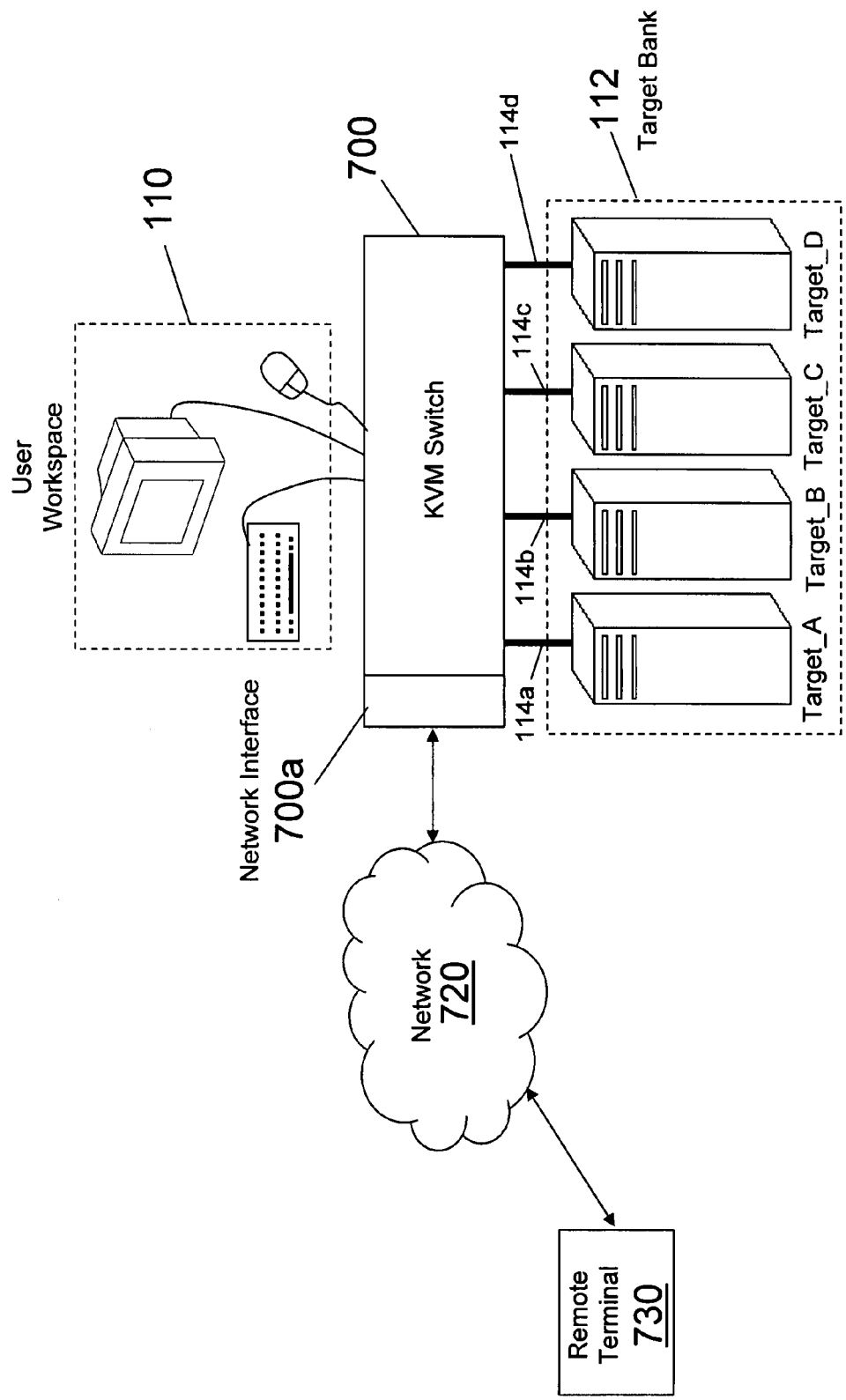
FIG. 7: a prior art KVM switch system where a remote terminal can access the switch through a network.

FIG. 7 shows an example of a KVM switch 700 that has a network interface 700a which allows switch 700 to be accessed by a remote terminal 730 via network 720. Remote terminal 730 uses a graphical user interface to change which target the user workspace 110 is connected to. Since multiple switches 700 can be connected to network 720, when remote terminal 730 accesses KVM switch 700 via network 720 control information sent from remote terminal 730 must be logically addressed to KVM switch 700. To send and receive logically addressed information the system requires the appropriate hardware/software which adds cost to the system.

In addition to the KVM switches described above some KVM switches that allow remote access include a setup port for allowing a local terminal to configure a KVM switch. Known setup ports provide only limited control of the KVM switch such as initial network settings and the like and do not control which targets are coupled to a user device. Examples of such KVM switches are Avocent KVM switches sold under the DSR trademark. The setup port of a DSR switch is described in chapter three of submitted document entitled "DSR Switch Installer/User Guide" published by Avocent Corporation in 2005, Document No. 590-419-501B, which is incorporated by reference in its entirety.

Although the KVM switches described above offer many alternative ways for a user to be connected to a target device without using an onboard control mechanism, none provide the user with a low cost mechanism to switch between targets or otherwise control a KVM switch when the switch is not within reach that is simple to use, not prone to inadvertent switching, easily placed within a user's workspace, and provides confirmation as to which target is being controlled.

Thus, it is desirable to provide a user with a low cost mechanism that allows switching between targets or provides other control functions to a desktop KVM switch when the switch is not within reach that is: simple to use, not prone to inadvertent switching, easily placed within a user's workspace, and provides confirmation as to which target is being controlled.

BRIEF DESCRIPTION OF THE PRESENTLY PREFERRED EXEMPLARY EMBODIMENTS

Figure 8:
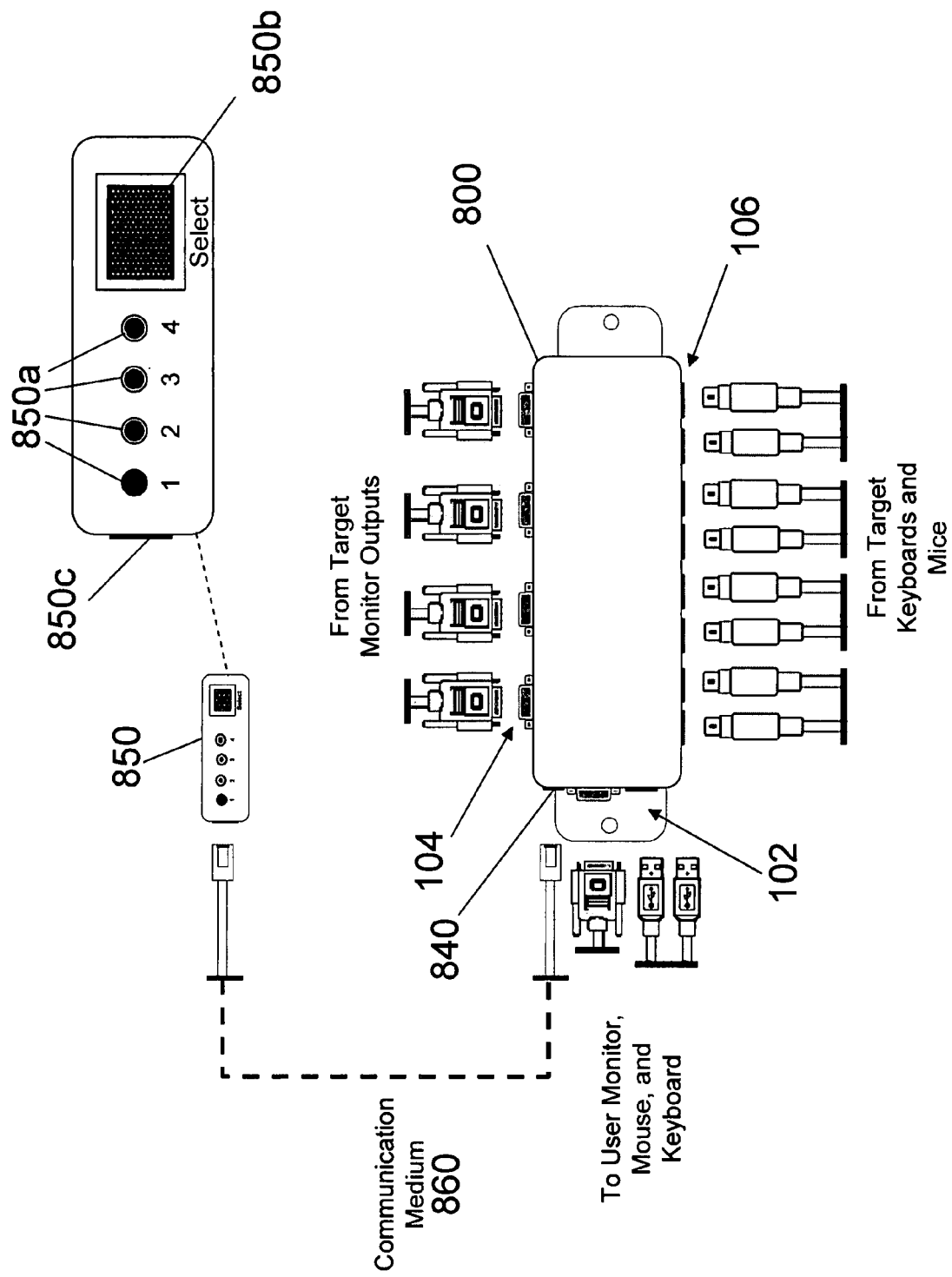
FIG. 8: an exemplary embodiment of a KVM switch system with an external controller.

FIG. 8 shows KVM switch 800 that is similar to KVM switch 100 where switch 800 receives video signals from respective targets (not shown) at video ports 104 and accesses keyboard and mouse ports from respective targets at ports 106 and allows a user to control a designated target by coupling the communication path from a selected target interfaced at 104 and 106 to user KVM port 102. It should be noted that although user's video, keyboard, and mouse ports are shown as a VGA port, a USB port, and a USB port respectively, this is not intended to be limiting and similar types of ports could be used as would be appreciated by one of ordinary skill in the art, e.g. keyboard ports and mouse port could be PS/2 ports. It should also be noted that keyboard and mouse can be bundled so that switch 800 has a single port for a keyboard and mouse of a respective target (e.g. combining keyboard and mouse into a single USB connection) and that video, keyboard, and mouse can be bundled so that switch 800 has a single port for each target device.

KVM switch 800 differs from KVM switch 100 in that KVM switch 800 does not include an onboard control interface. Instead KVM switch 800 includes an external control interface 840 that allows external controller 850 to communicate with KVM switch 800 via communication medium 860. KVM communication interface 840 is typically a USB port and the communication medium 860 is typically a USB cable, but alternative types could be used. For example, interface 840 could be any type of interface that allows external controller 850 to communicate with switch 800 including but not limited to: a CAT5 connection, twisted pair connection, a single wire connection, a coax cable connection, an optical connection, an IR connection or any other type of wireless connection. Moreover, communication medium 860 could be any medium compatible with the chosen interface i.e. the appropriate cabling or, in the event of wireless communication, simply air. It should be noted that communication medium 860 may also provide power to external controller 850 from KVM switch 800, when the type of communication medium 860 (e.g. USB cable) is capable of providing power. In the event that communication medium 860 cannot provide power to external controller 850 from KVM switch 800, external controller 850 must receive its power from another source. In this instance, external controller 850 would typically receive power from batteries within the external controller 850, from another device, or from an alternative power supply such as a transformer.

As shown in FIG. 8, external controller 850 includes exemplary control mechanism 850b (similar to control mechanism 108b) and a select button that allows the user to cycle through the targets. Likewise, exemplary display 850a (similar to display 108a) includes an illuminated LED corresponding to a target indicating that the target is coupled to the user.

It should be noted that although control mechanism 850b of external controller 850 is shown with a single button that cycles through targets, this is for exemplary purposes only. Control mechanism 850b of external controller 850 can include alternative configurations that provide the same or additional functionality. For example, external controller 850 could have rocker or accordion switches, each corresponding to a KVM port where, when a switch is depressed the corresponding KVM port is coupled to the port 102. As an alternative, the external controller 850 could have buttons in addition to the select button that provide control functions to the switch 800. Any combination of known KVM switch commands (e.g. reset, autoscan, etc.) can be incorporated into external controller 850.

It should also be noted that exemplary display 850a is shown as a set of LEDs for exemplary purposes only. Display 850a is not limited to a set of LEDs and could be any appropriate display mechanism. Display 850a could be a seven segment LED display where a number representing which target is coupled to the user is displayed or a small LCD display that graphically represents which target is coupled to the user. Further, display 850a could be configured to display more information than simply which target is coupled to the user e.g. whether switch 800 is scanning or the status of other switch functions. Display 850a could also incorporate control mechanism 850b e.g. providing both functions through a touch screen.

External controller 850 also includes communication interface 850c that is similar to communication interface 840 in that it interfaces external controller 850 to communication medium 860. Communication interface 850c can be any type of communication interface compatible with communication medium 860. It should be noted that communication interface 840 and communication interface 850c need not be the same type. For example, a wireless transmitter can be built into external controller 850 and communication interface 840 can be a USB port that interfaces communications medium 860 with a USB receiver. This is similar to a wireless mouse communicating with a PC via the PC's USB port where the wireless mouse transmits signals to a receiver docked to the PC's USB port.

It should be noted that external controller 850 is typically designed to communicate only with KVM switch 800 and as such, information sent from the external controller 850 to switch 800 need not be logically addressed.

Figure 9:
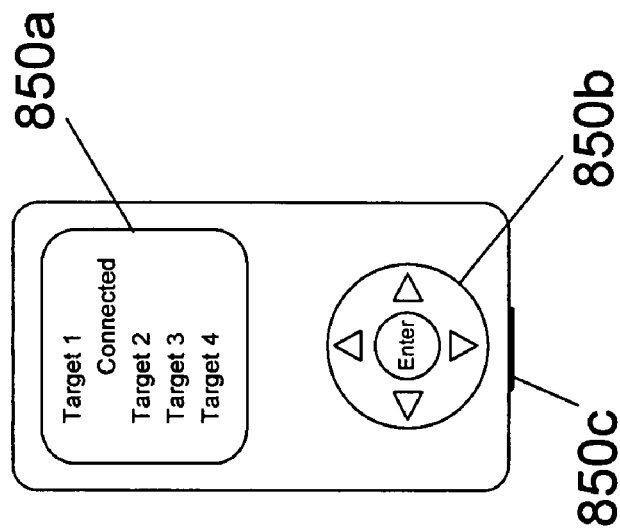
FIG. 9: an exemplary external controller.

FIG. 9 shows an alternative exemplary embodiment of an external controller 850. In FIG. 9, display 850a is a display that uses a GUI to indicate which targets are connected to the user station. In FIG. 9, control mechanism 850b is shown as a navigation pad that allows a user to select commands displayed on display 850a. It should be noted that external controllers used to control switch 800 can incorporate any combination of the displays and access mechanisms described in accordance with FIGS. 8 and 9.

Figure 10:
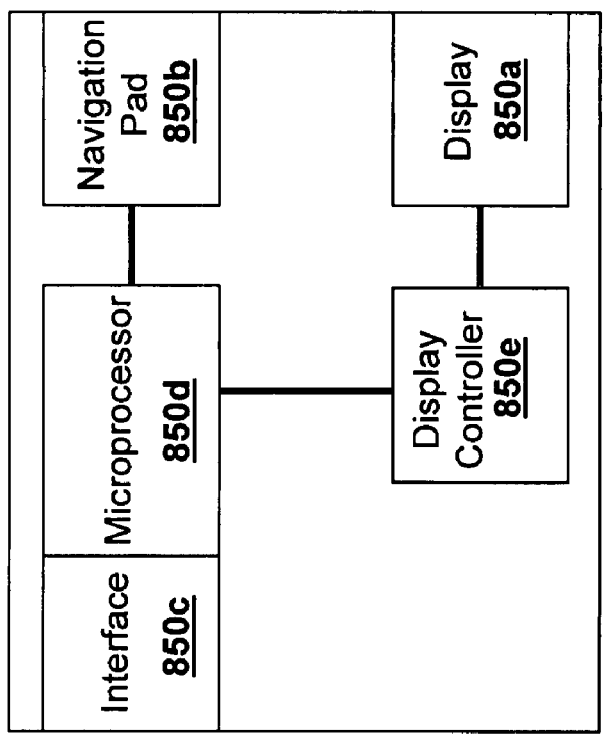
FIG. 10: an exemplary block diagram of an exemplary external controller.

FIG. 10 shows an exemplary block diagram of external controller 850. In addition to elements of external controller 850 previously described, FIG. 10 shows microprocessor 850d and display controller 850d. Microprocessor 850d processes commands received from user, communicates with interface, and sends display information to display controller 850e. Display controller 850e allows display 850a to be updated as would be appreciated be one of ordinary skill in the art.

Figure 11:
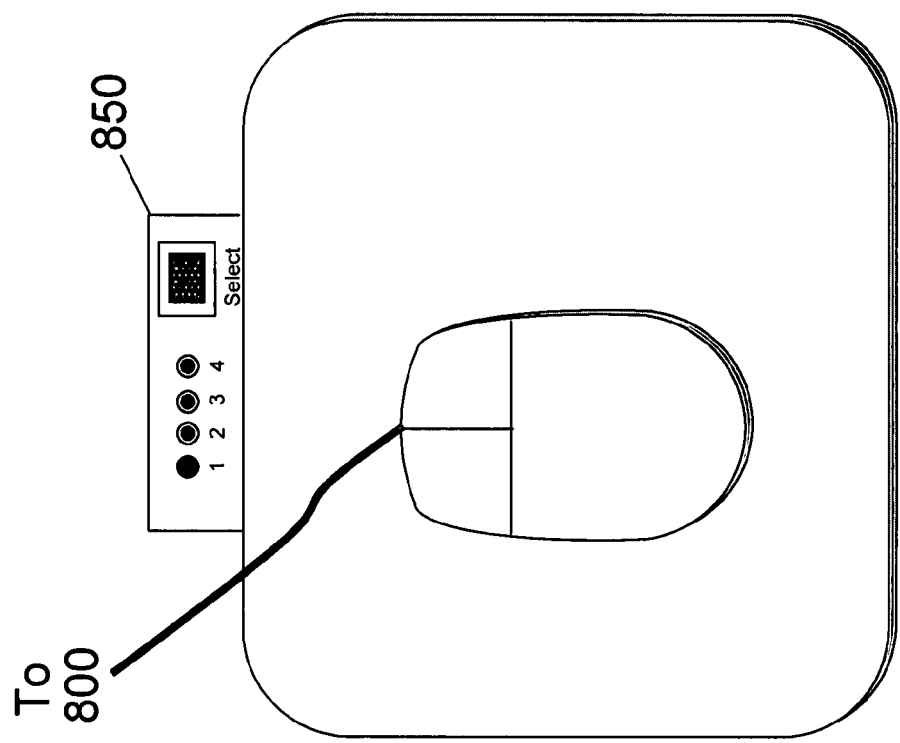
FIG. 11: an exemplary external controller built-into a mouse pad.

External controller 850 is typically designed to be smaller than KVM switch 800 while still being large enough so that a user can manipulate it. External controller 850 is typically small enough to comfortably fit within one's pocket. External controller 850 can also include an adhesive (not shown) on a side which is not the side with display 850a so that external controller 750 can be adhered to an object within the user's workspace (e.g. a display or a keyboard while still allowing the user to view the display). The adhesive can be designed to provide permanent attachment (e.g. glue) or temporary/removable attachment (e.g. a Velcro strip, a magnet, a suction cup, a clip, or any other suitable mechanical or chemical means). When external controller 850 is designed to adhere to an object on a user's desktop (e.g. a user's display), external controller 850 should be small enough as to be discreet. Further, external controller 850 can be built into objects that are placed within a user's workspace. FIG. 11 shows an external controller 850 built into a mouse pad.

Figure 12:
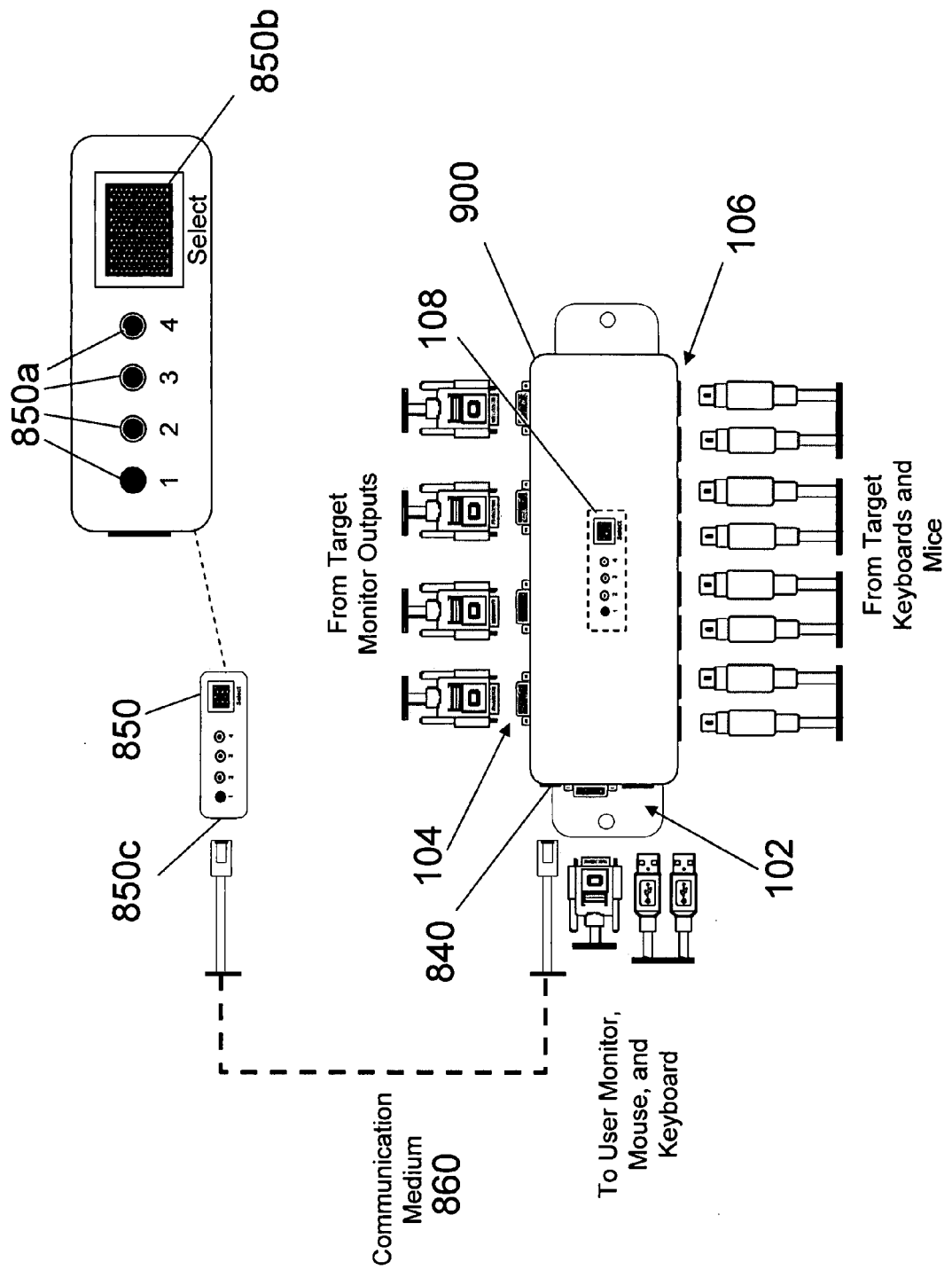
FIG. 12: an alternative exemplary embodiment of a KVM switch system with an external controller.

FIG. 12 shows an alternative embodiment of a KVM switch that, like KVM switch 100, includes: (1) video ports 104 that receive target video signals, (2) ports 106 that receive keyboard and mouse signals, (3) a user KVM port 102, and (4) an onboard control interface 108. KVM switch 900 also incorporates the external control functionality of KVM switch 800. That is, KVM switch 900 comprises a communication interface 840, communication medium 860, and an external controller 850. Thus, KVM switch 900 provides all the functionality of KVM switch 100 but can also be controlled remotely, like KVM switch 800, if a user desires. It should be noted that although onboard control interface 108 and external controller 850 are both shown as having a set of LEDs and a select button, this is for exemplary purposes only and not intended to be limiting. Display 108a and/or control mechanism 108b of onboard control interface 108 do not need to be the same as display 850a and control mechanism 850b of external controller 850. Display 108a, control mechanism 108b, display 850a, and control mechanism 850b can be any combination of types of displays and control mechanisms described above. For example, display 108a may be a seven segment display and display 850a may be a set of LEDs where both control mechanisms include a select button. It should be noted that KVM switch 900, like any of the KVM switch embodiments described above, does not need to include hotkey control, but can optionally include hotkey control.

Figure 13A:
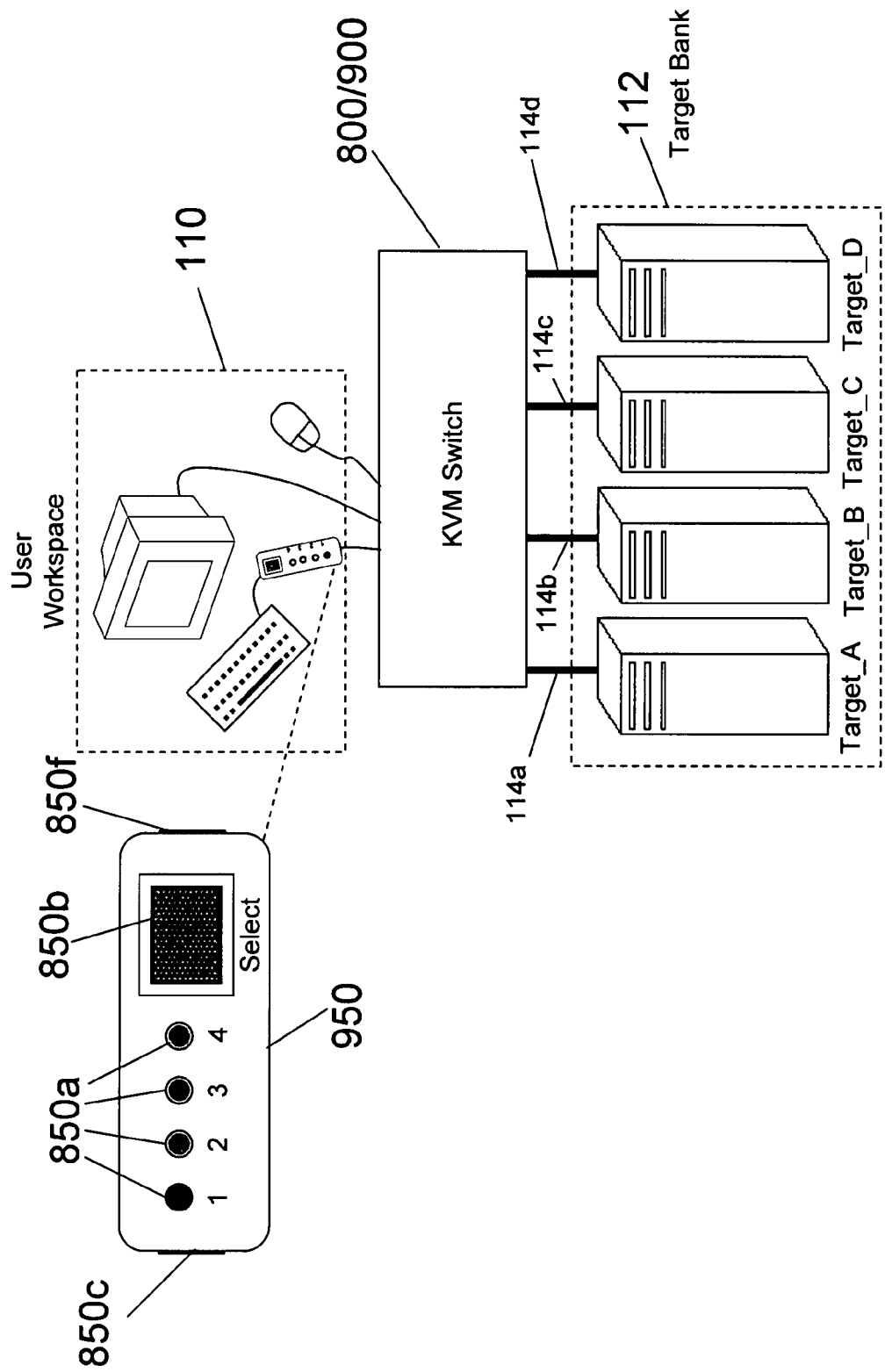
FIG. 13a: a KVM switch system incorporating an alternative exemplary external controller.

FIG. 13a shows a KVM switch system with an alternative external controller 950. External controller 950 is designed to interface a user's keyboard or be built into a user's keyboard. External controller 950 includes display 850a, selection mechanism 850b, and interface 850c which are similar to respective parts described in accordance with external controller 850. External controller 950 also includes interface 850f which allows controller 950 to interface a user's keyboard. By being directly coupled to or built into a user's keyboard, external controller 950 is within a user's reach but does not have the drawbacks of hotkey commands and provides the additional benefit of indicating which target a user is connected to. Further, by only interfacing a user's keyboard and not a user's monitor or mouse, controller 950 can be more easily placed at various locations on a user's desktop. It should also be noted that external controller 950 can be interfaced or be built into a user's mouse as an alternative to being interfaced or built into the user's keyboard. FIG. 13c shows a block diagram of external controller 950.

Figure 13B:
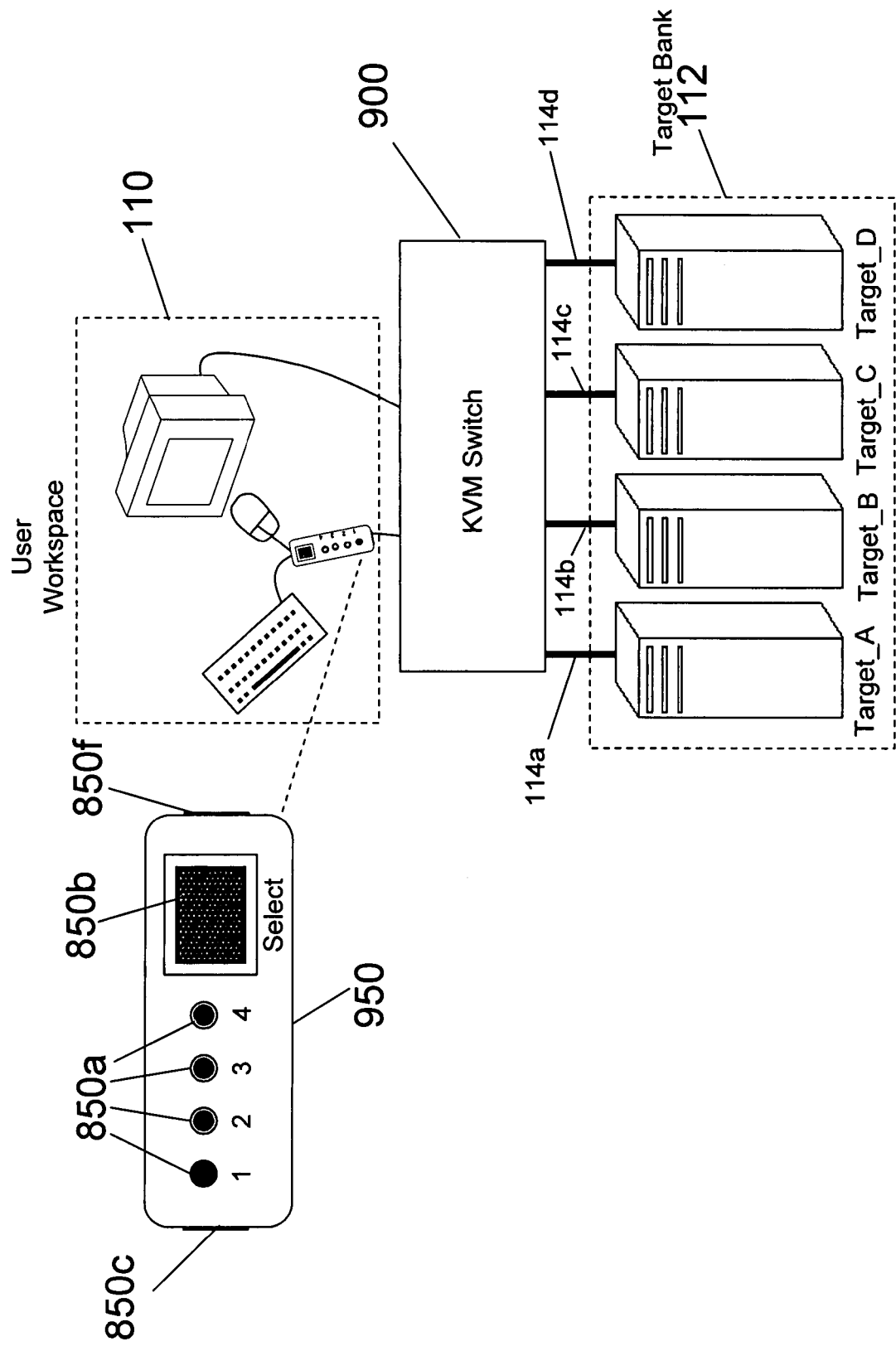
FIG. 13b: a KVM switch system incorporating an alternative exemplary external controller.
Figure 13C:
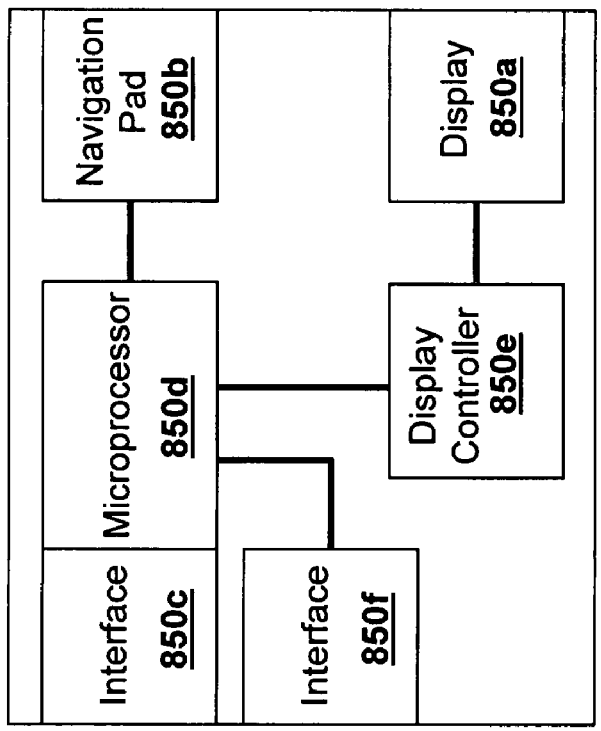
FIG. 13c: an exemplary block diagram of an exemplary external controller.

FIG. 13b shows a KVM switch system that is similar to the KVM switch system described in accordance with FIG. 13a where external controller 950 interfaces user's keyboard and mouse. The KVM switch system shown in FIG. 13b is particularly advantageous when keyboard and mouse come from a common connection as is the case with USB type devices.

It should be noted that although the exemplary embodiments have been described in accordance with a 4-to-1 desktop KVM switch (4 targets, 1 user) such a description is for exemplary purposes only. It should be appreciated that a desktop KVM switch with any number of targets and number of users could be used. Where the desktop KVM switch incorporates multiple users, each user could be provided an external controller.

Figure 14:
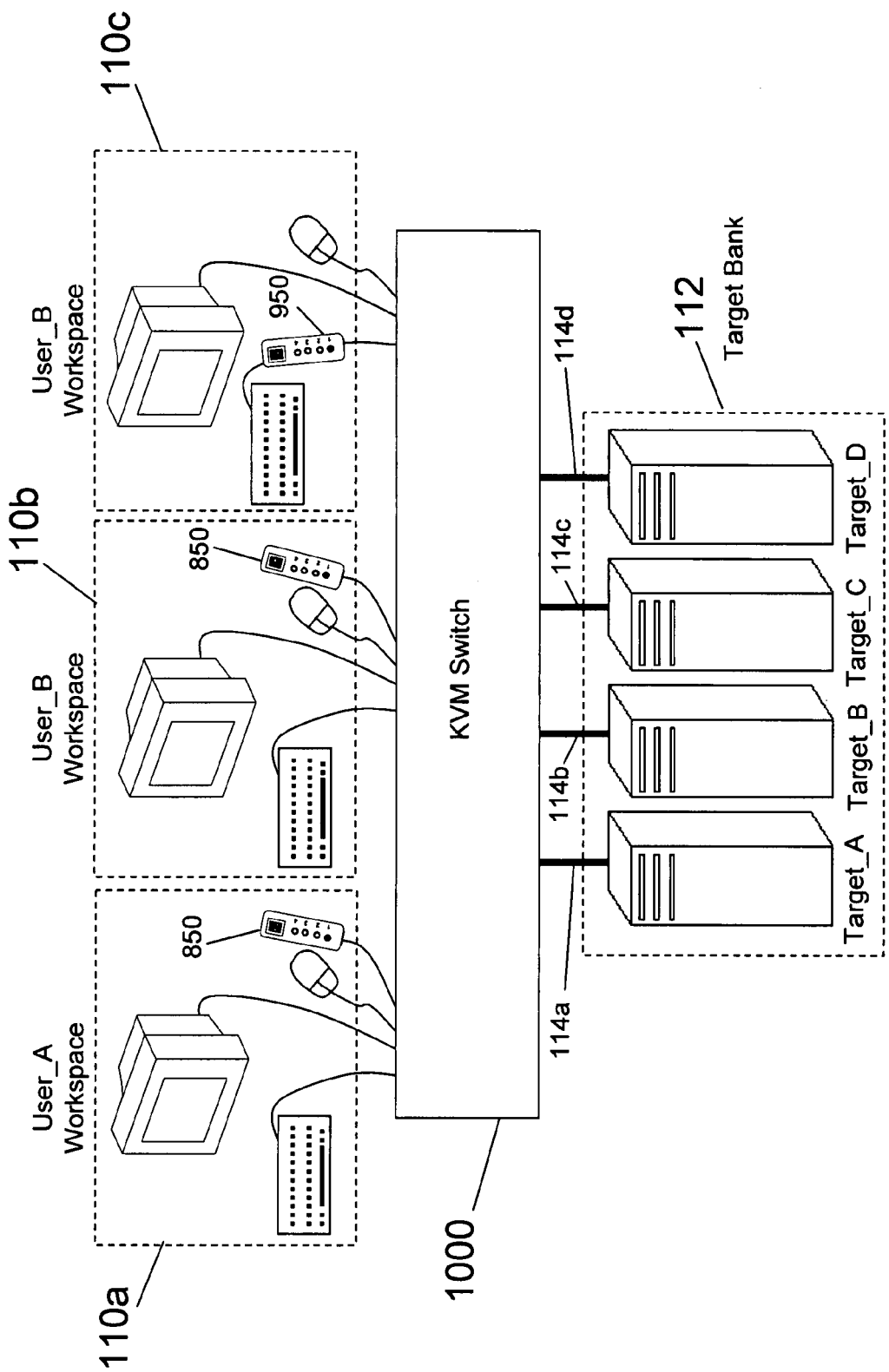
FIG. 14: an exemplary embodiment of a KVM switch system with external controllers.

FIG. 14 shows an exemplary embodiment where multiple users are connected to a KVM switch and each user has an external controller within their respective workspace. The KVM devices of each workspace 110a, 110b, and 110c are connected to KVM switch 1000 through standard connections as described in accordance with FIG. 1. Each workspace is shown including respective external controllers 850, 850, and 950. It should be noted that any combination of types of external controllers could be used with switch 1000. When external controllers are used in a multi-user KVM switch the external controllers can be configured to allow users to control only which target their respective KVM devices are connected to or the controllers can be configured to control which target any of the other users are connected to.

It is also recognized that it would be useful to use external controllers 850 and 950 with prior art KVM switches. FIGS. 15-18 describe exemplary embodiments where an external controller 850 is used with a prior art KVM switch.

Figure 15:
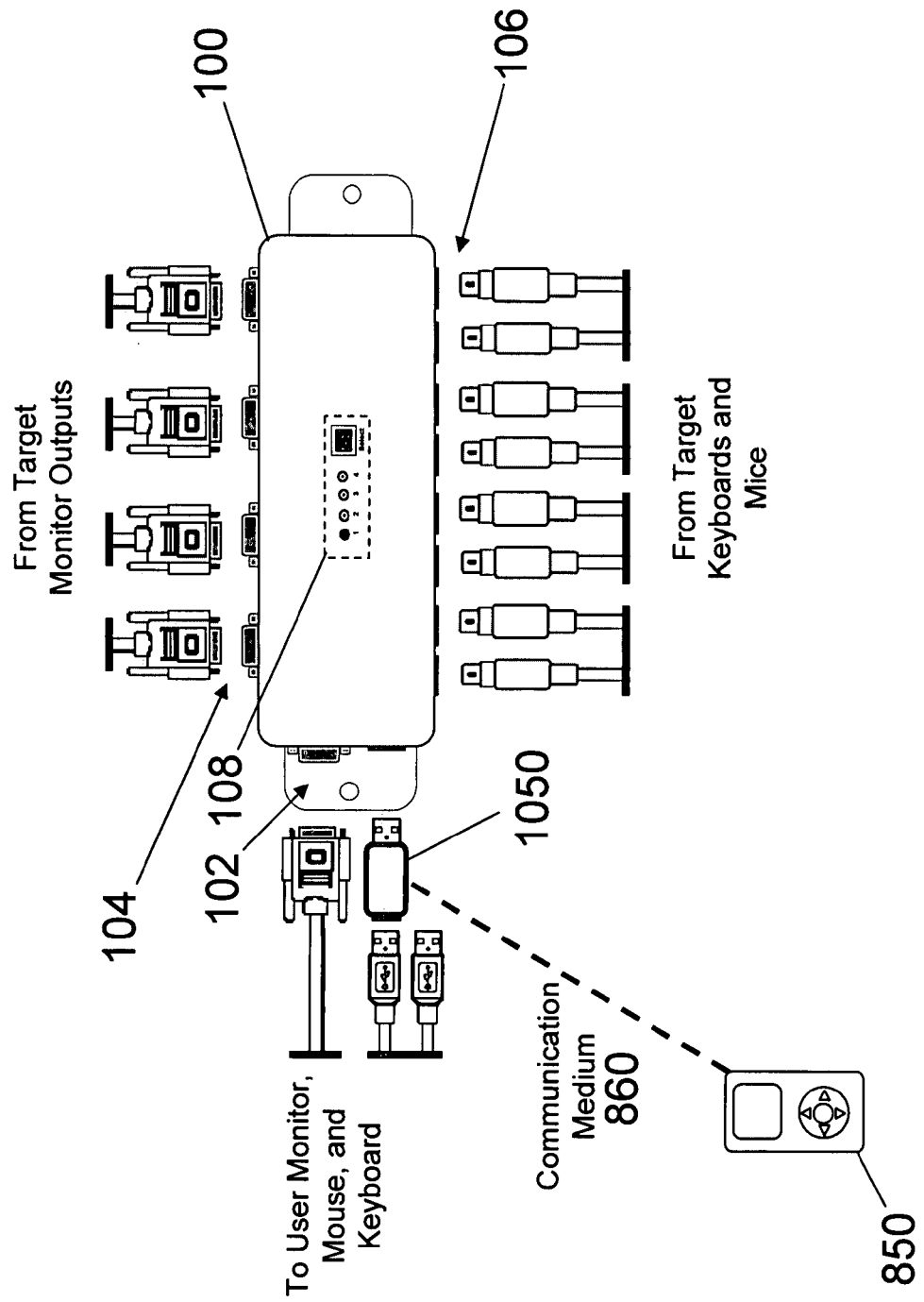
FIG. 15: an exemplary KVM switch system incorporating an external controller and a micro-receiver.

FIG. 15 shows where external controller 850 can control prior art KVM switch 100 by passing supported switch commands through micro-receiver 1050.

Figure 16:
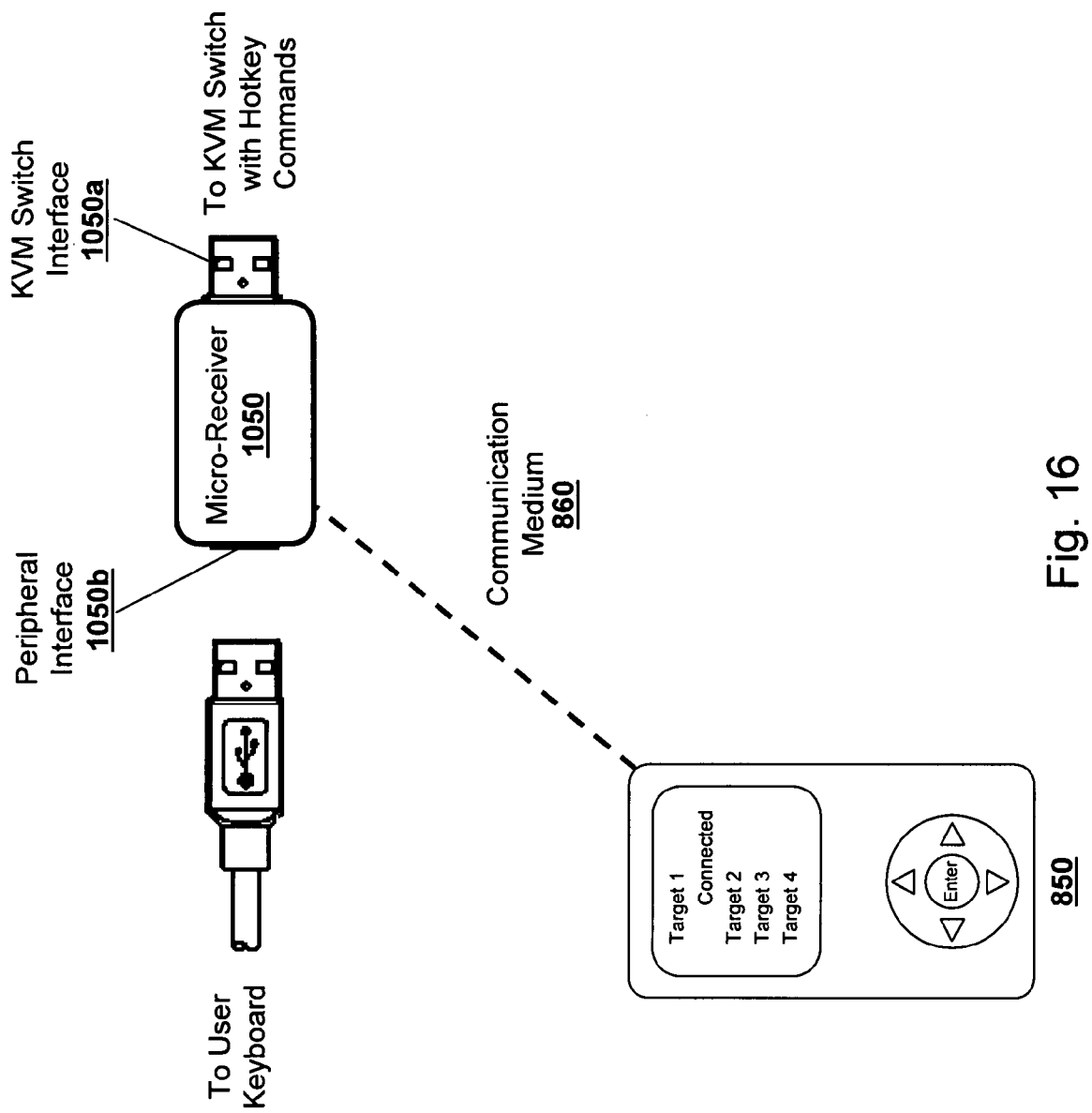
FIG. 16: an exemplary external controller with a micro-receiver.

FIG. 16 shows a more detailed view of an exemplary micro-receiver 1050. Micro-receiver 1050 interfaces a user peripheral (e.g. a user keyboard) through a peripheral interface 1050b (e.g. USB or PS/2 port). Micro-receiver 1050 also interfaces a KVM switch at KVM interface 1050a (e.g. USB or PS/2 connector). Interfaces 1050a and 1050b transparently pass communications between a user peripheral and a KVM passed through the micro receiver 1050. That is, the user peripheral and the KVM switch operate as if they were directly connected. Micro-receiver 1050 also communicates with external controller 850 through communication medium 860, described above. The KVM switch is able to be controlled by external controller 850 by the micro-receiver 1050 receiving commands from external controller 850 and passing those commands to the KVM switch in an appropriate format.

Figure 17:
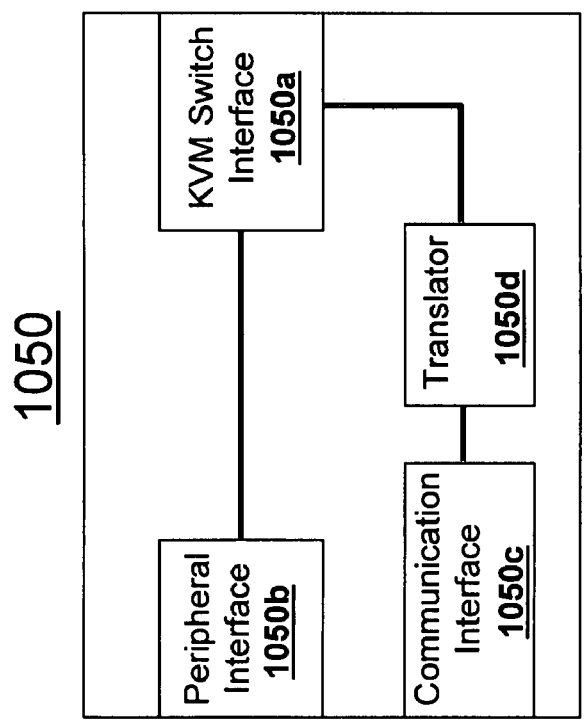
FIG. 17: a block diagram of an exemplary micro-receiver.

FIG. 17 shows an exemplary block diagram of an exemplary micro-receiver 1050 that illustrates how commands from an external controller 850 can be received by a KVM switch. Commands are received from external controller 850 at the communication interface 1050c. Communication interface 1050c is similar to control interface 840 described above and for the sake of brevity will not be described herein. The received commands are passed from communication interface 1050c to translator 1050d. Translator 1050d translates the commands into an appropriate form so they can be processed by the KVM switch. An example of the translation process is as follows: assuming a prior art KVM switch supports hotkey commands, a command received at the communication interface 1050c can be translated by translator 1050d into the hotkey command corresponding to the received command and passed to the KVM switch at KVM switch interface 1050a. In the example described above, the micro-receiver 1050 spoofs the KVM switch that all received commands (including hotkey commands) are generated from a keyboard that is directly connected to the KVM switch.

For an external controller 850 to command a prior art KVM switch, the KVM switch must be capable of accepting such a command through a peripheral port and micro-receiver 1050 must be able to transfer commands from external controller 850 in a compatible format for the specific prior art KVM switch. Thus, reconfiguration of micro-receiver 1050 and/or KVM switch is required. For example, if a KVM switch can execute commands through hotkeys sequences, the micro-receiver 1050 must be programmed to use these sequences, This requires reconfiguration as different KVM switches may have different hotkey sequences for the same function.

Figure 18:
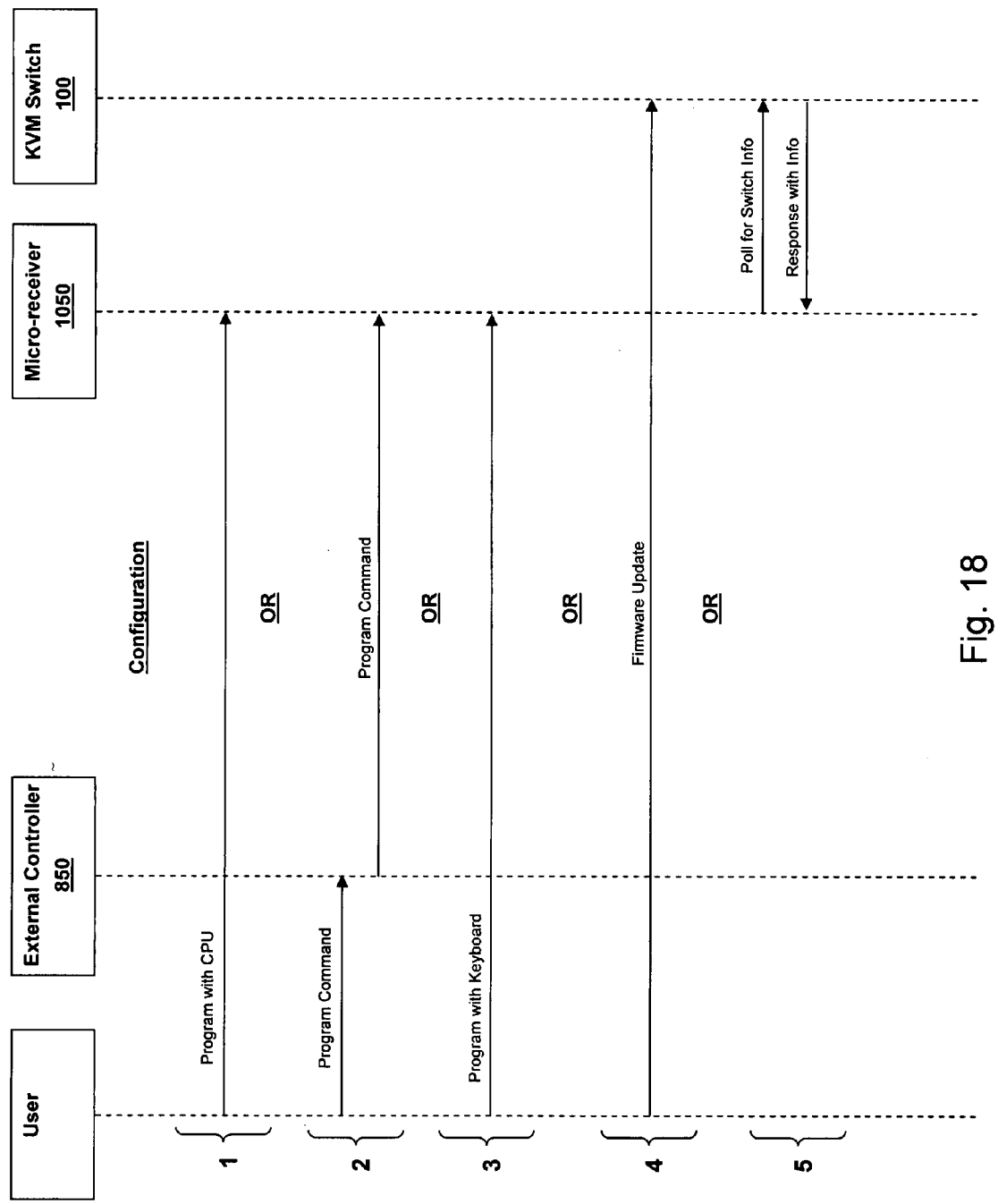
FIG. 18: a diagram illustrating various ways to configure a KVM switch system with an external controller and a micro-receiver.

FIG. 18 shows a diagram illustrating various ways to configure a KVM switch system with an external controller and a micro-receiver. FIG. 18 shows four alternative methods. Methods 1, 2, and 3 show configuration of micro-receiver 1050. Thus, methods 1, 2, and 3 only require configuration of micro-receiver 1050. In method 1, a user is able to configure micro-receiver through a PC. An example of how this can occur is as follows: micro-receiver 1050 is coupled to a PC using KVM interface 1050a (e.g. plugging micro-receiver into USB port of a PC) and the user programs the micro-receiver 1050 using software on the PC. For example, the software can allow the user to specify the model number of a KVM switch and the PC will program the micro-receiver 1050 accordingly.

In method 2, the user configures the micro-receiver 1050 using external controller 850. An example of this method is the user manipulating the control interface of the external controller 850 as to indicate the model of the KVM switch. After the model is indicated micro-receiver 1050 is configured in a manner similar to that of method 1. Once micro-receiver 1050 is configured, it may not be necessary to configure the KVM switch, for example, when KVM switch supports all necessary commands through hotkeys sequences or the like.

In method 3, the user configures the micro-receiver 1050 using a keyboard connected to the micro-receiver 1050. This can be achieved by using a hotkey sequence to specify a particular KVM switch or by using hotkey sequences to program individual commands of the micro-receiver 1050.

Methods 4 and 5 show configuration of a KVM switch. In method 4, a firmware update of the KVM switch allows KVM switch to process commands from micro-receiver 1050. This process is similar to updating keyboard and mouse drivers in a KVM switch so a KVM switch is compatible with a new device.

In method 5, micro-receiver 1050 is automatically programmed when it is inserted into the KVM switch. That is, micro-receiver 1050 polls KVM switch for identification information and KVM switch responses to the poll with its identification information. After identification information is indicated micro-receiver 1050 is configured in a manner similar to that of method 1. After the model is indicated micro-receiver 1050 is configured in a manner similar to that of method 1.

Once KVM switch is configured, it may not be necessary to configure micro-receiver 1050, for example, when micro-receiver 1050 issues commands to a KVM switch in a generic format. Any of the methods described above can be used in any number of combinations. For example, before method 4 can be implemented it may be required to update the firmware of the KVM switch as described in method 3 (e.g. micro-receiver does not need to be configured or already is configured).

Figure 19:
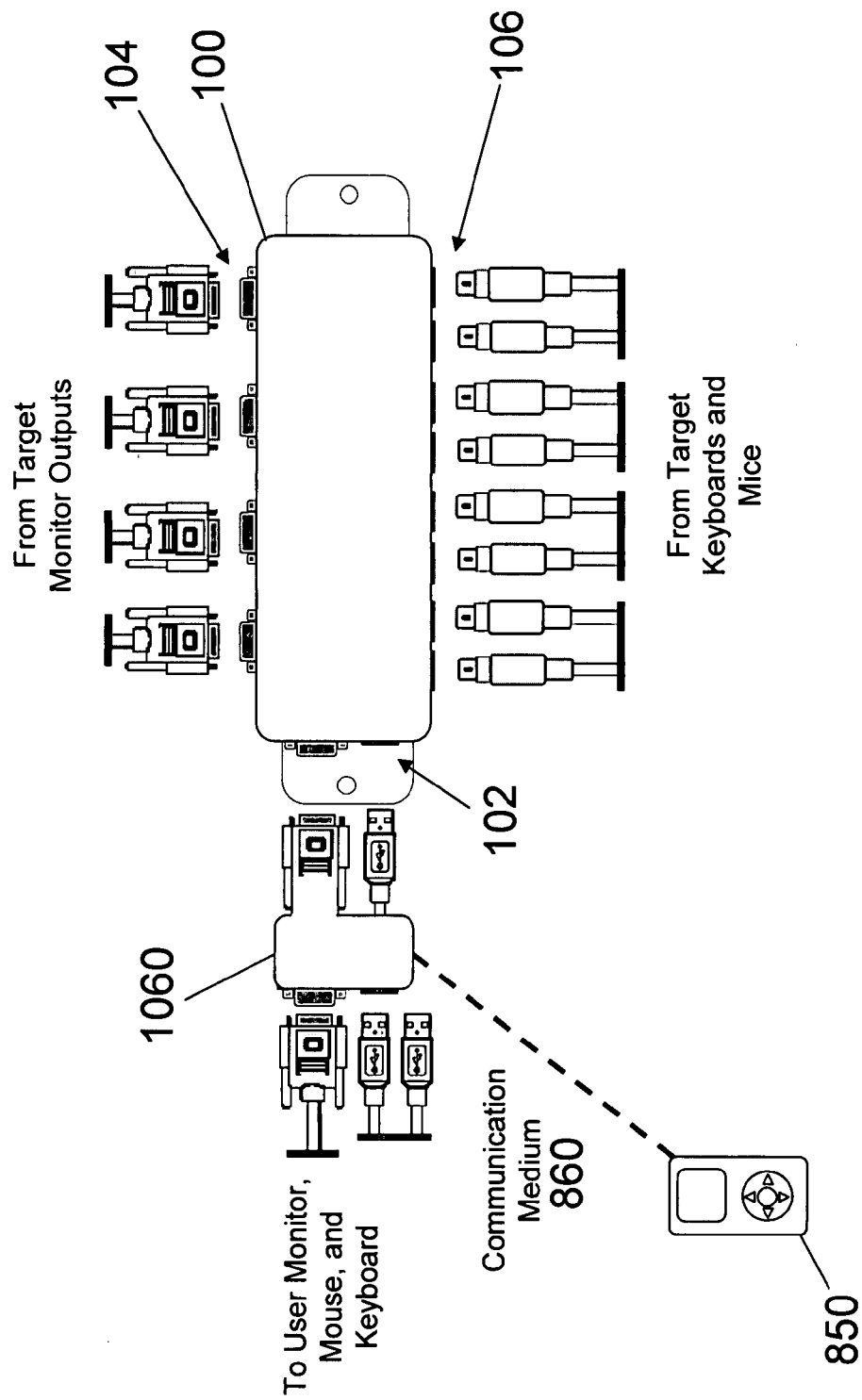
FIG. 19: an exemplary KVM switch system incorporating an external controller and a micro-receiver.

FIG. 19 shows an alternative embodiment of a micro-receiver 1060. Micro-receiver 1060 interfaces a user monitor (not shown) and the video port of a prior art KVM switch 100. It should be noted that micro-receiver 1060 can interface a user monitor and KVM switch 100 by being connected at either end of a video cable, either near KVM switch 100 or near the monitor. Micro-receiver 1060 responds to wireless commands received from external control 850 via communications medium 860 (e.g., wirelessly) to temporarily or permanently superimpose via the monitor an indication of the status of the KVM switch (e.g. which target the user is connected to and/or whether the KVM switch is in scanning mode).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. An external controller for use with a peripheral switch coupling user peripheral devices to a plurality of target devices, the external controller comprising:
   a peripheral user input device interface for coupling the external controller to the peripheral switch;
   a selector switch for requesting that the external controller change which of the plurality of target devices is connected to the user peripheral devices;
   control circuitry for commanding, via the peripheral user input device interface, the peripheral switch to couple the user peripheral devices to at least one of the plurality of target devices, using a command that appears to the peripheral switch to have come from one of the user peripheral devices; and
   a display adapted to indicate which of the plurality of target devices is coupled to the user peripheral devices through the peripheral switch, wherein the external controller does not include an interface for receiving video signals from the plurality of target devices.

2. The external controller of claim 1, wherein said display comprises a series of LEDs.

3. The external controller of claim 1, wherein said display comprises an LCD display.

4. The external controller of claim 1, wherein said external controller is integrated into a mouse pad.

5. The external controller of claim 1, wherein said selector switch and said display encompass substantially all of one face of the external controller.

6. The external controller of claim 1, wherein said control circuitry commands the peripheral switch to couple the user peripheral devices to at least one of the plurality of target devices by converting an actuation of said selector switch into a keystroke sequence receivable by said peripheral switch for causing the peripheral switch to change which of plural target devices the peripheral switch connects the user peripheral devices to.

7. A micro-receiver comprising:
   a peripheral user input device interface adapted to couple a peripheral user input device to said micro-receiver;
   an output interface adapted to couple said micro-receiver to a peripheral user input device port of a KVM switch;
   circuitry for passing peripheral input device signals from the peripheral user input device attached to the peripheral user input device interface to the output interface in a computer peripheral format;

a command interface, separate from the input interface, for receiving commands from an external controller separate from the computer peripheral; and a converter for converting commands received from the external controller and not from the computer peripheral to commands in a computer peripheral format that can be received by the KVM switch via the peripheral user input device port of the KVM switch and applying the converted commands to the output interface, such that the commands appear to the KVM switch to have come from the peripheral user input device.

8. The micro-receiver of claim 7, wherein said converter is reprogrammable such that the converter can convert commands received from the external controller into commands that can be received by a particular KVM switch of a plurality of possible KVM switches.

9. The micro-receiver of claim 7, wherein said converter converts commands received by an external controller into a keystroke sequence receivable by the KVM switch for causing the KVM switch to change which of plural target devices the KVM switch connects the peripheral user input device to.

10. A peripheral switch system comprising:
a peripheral switch coupling user peripheral devices to a plurality of target devices;
an external controller for use with the peripheral switch coupling user peripheral devices to a plurality of target devices, the external controller comprising:
a peripheral user input device interface for coupling the external controller to the peripheral switch;
a selector switch for requesting that the external controller change which of the plurality of target devices is connected to the user peripheral devices;
control circuitry for commanding, via the peripheral user input device interface, the peripheral switch to couple the user peripheral devices to at least one of the plurality of target devices, using a command that appears to the peripheral switch to have come from one of the user peripheral devices; and
a display adapted to indicate which of the plurality of target devices is coupled to the user peripheral devices through the peripheral switch, wherein the external controller does not include an interface for receiving video signals from the plurality of target devices.

11. An external controller for use with a peripheral switch coupling user peripheral devices to a plurality of target devices, the external controller comprising:
a wireless communications interface for coupling the external controller to the peripheral switch;
a selector switch for requesting that the external controller change which of the plurality of target devices is connected to the user peripheral devices;

control circuitry for commanding, via the wireless communications interface, the peripheral switch to couple the user peripheral devices to at least one of the plurality of target devices; and
a display adapted to indicate which of the plurality of target devices is coupled to the user peripheral devices through the peripheral switch, wherein the external controller does not include an interface for receiving video signals from the plurality of target devices.

12. The external controller of claim 11, wherein said display comprises a series of LEDs.

13. The external controller of claim 11, wherein said display comprises an LCD display.

14. The external controller of claim 11, wherein said external controller is integrated into a mouse pad.

15. The external controller of claim 11, wherein said selector switch and said display encompass substantially all of one face of the external controller.

16. The external controller of claim 11, wherein said control circuitry commands the peripheral switch to couple the user peripheral devices to at least one of the plurality of target devices by converting an actuation of said selector switch into a keystroke sequence receivable by said peripheral switch for causing the peripheral switch to change which of plural target devices the peripheral switch connects the user peripheral devices to.

17. A micro-receiver comprising:
an input interface adapted to couple a computer peripheral to said micro-receiver in a computer peripheral format;
an output interface adapted to couple said micro-receiver to a computer peripheral port of a KVM switch;
a wireless command interface, separate from the input interface, for receiving commands from an external controller separate from the computer peripheral; and
a converter for converting commands received from the external controller and not from the computer peripheral to commands in a computer peripheral format that can be received by a KVM switch via the computer peripheral port of the KVM switch and applying the converted commands to the output interface.

18. The micro-receiver of claim 17, wherein said converter is reprogrammable such that the converter can convert commands received from the external controller into commands that can be received by a particular KVM switch of a plurality of possible KVM switches.

19. The micro-receiver of claim 17, wherein said converter converts commands received by an external controller into a keystroke sequence receivable by a\the KVM switch for causing the KVM switch to change which of plural target devices the KVM switch connects the user peripheral devices to.

* * * * *